United States Patent
Wefers (10) Patent No.: US 6,442,866 B2
(45) Date of Patent: Sep. 3, 2002

(54) METHOD AND APPARATUS FOR DRYING OR HEAT-TREATING PRODUCTS

(76) Inventor: Michael Wefers, Westerlandanger 10, D-81929 Munich (DE)

( * ) Notice: Subject to any disclaimer, the term of this patent is extended or adjusted under 35 U.S.C. 154(b) by 0 days.

(21) Appl. No.: 09/911,303

(22) Filed: Jul. 23, 2001

Related U.S. Application Data (63) Continuation of application No. 09/244,278, filed on Feb. 3, 1999, now Pat. No. 6,297,479.

(30) Foreign Application Priority Data

Feb. 4, 1998 (DE) .......................................... 198 04 386

(51) Int. Cl.[7] ................................................. F26B 3/34
(52) U.S. Cl. .............................. 34/263; 34/259; 34/264; 34/266; 219/388; 219/686; 219/701; 432/152; 426/242; 99/472
(58) Field of Search .......................... 34/259, 263, 264, 34/266, 92; 219/388, 686, 700, 701; 432/152, 128; 426/242; 99/472

(56) References Cited

U.S. PATENT DOCUMENTS

| | | | |
|---|---|---|---|
| 3,769,717 A | 11/1973 | Lorentzen et al. | 34/92 |
| 4,640,020 A | 2/1987 | Wear et al. | 34/263 |
| 4,746,968 A | 5/1988 | Wear et al. | 219/701 |
| 5,020,237 A | 6/1991 | Gross et al. | 219/701 |
| 5,135,122 A | 8/1992 | Gross et al. | 219/701 |
| 5,202,139 A | 4/1993 | Gaon et al. | 426/242 |
| 5,334,402 A | 8/1994 | Ovadia | 219/686 |
| 5,676,042 A | 10/1997 | Sakuma et al. | 99/330 |
| 5,676,989 A | 10/1997 | Durance et al. | 426/242 |
| 5,962,057 A | 10/1999 | Durance et al. | 426/242 |
| 5,964,043 A | 10/1999 | Oughton et al. | 34/92 |
| 5,980,962 A | 11/1999 | Bracken et al. | 219/686 |
| 6,004,590 A | 12/1999 | Subramaniam et al. | 426/242 |
| 6,025,580 A | 2/2000 | Yagi | 219/686 |

FOREIGN PATENT DOCUMENTS

| | | |
|---|---|---|
| DE | 1604798 | 11/1973 |
| DE | 295 17 499 U I | 3/1997 |
| GB | 2071833 | 9/1981 |
| JP | 62-158476 | 7/1987 |
| JP | 7-255388 | 10/1995 |
| JP | 11-83327 | 2/1999 |

Primary Examiner—Ira S. Lazarus
Assistant Examiner—Kathryn S. O'Malley
(74) Attorney, Agent, or Firm—St. Onge Steward Johnston & Reens LLC (57) ABSTRACT

The invention relates to a method and an apparatus for drying or heat-treating substances or products at a pressure other than atmospheric pressure. The invention relates furthermore to banana chips dried by means of this method and banana powder produced therefrom. For drying or heat-treating, the products to be treated are loaded in transport receptacles which are subsequently charged via charging lock chambers into a treatment chamber and discharged therefrom via discharging lock chambers. For drying or heat treating, at least one microwave source is provided in the treatment chamber. Furthermore, an infrared heating source may be provided. After heat-treating or drying, a resting period may be scheduled. More particularly for this purpose, a vertically-oriented conveying system is provided in the treatment chamber when a longish resting period is involved. The transport receptacle is configured dished and my comprise nets on which the products are applied. The method is employed preferably for drying or heat-treating basic food material, e.g. for food products or medicinal drugs.

15 Claims, 4 Drawing Sheets

METHOD AND APPARATUS FOR DRYING OR HEAT-TREATING PRODUCTS

PRIOR APPLICATION

This Application is a Continuation Application of Ser. No. 09/244,278 now U.S. Pat. No. 6,297,479 filed Feb. 3, 1999 which claims priority from German Application No. DE 198 04 386.4 filed Feb. 4, 1998.

FIELD OF THE INVENTION

The present invention relates to a method for drying or heat-treating products or substances, namely food products. Further it relates to an apparatus for drying or heat-treating products, namely food products. Finally, the invention relates to a dried food product.

SUMMARY OF THE INVENTION

To accelerate drying and for a more gentle treatment, heat-treating substances, such as agricultural products for example, is often done at a reduced pressure in a pressure-tight treatment chamber in which a heating source is arranged. Liquid products are usually pumped into the treatment chamber for treatment where they are evenly distributed on an endless conveyor belt which guides them past a heating source. In this arrangement the conveyor belt serves two functions, namely transporting, on the one hand, and, on the other, receiving and guiding the product to be treated. For this purpose the conveyor belt is usually configured troughed, for example upswept or provided with side sealing means. On completion of drying the treated product is scraped from the rear end of the belt and discharged via a dual gating system, for example. If the product to be treated is available as a solid or lumpy product a dual gating system is usually also provided for charging.

One such system is disclosed for example from DE 295 17 499 U1. This system comprises a treatment chamber in which microwave treatment and vacuum drying take place, the product to be treated being conveyed by an endless conveyor belt into the treatment chamber. Charging and discharging the treatment chamber is done via a dual gating system in exploiting the force of gravity. On impacting the conveyor belt the infalling product may be deformed and remain adhering to the conveyor belt. The product to be treated comes into contact with various components, such as with the dual gating system and the conveyor belt, for example.

In systems for heat-treating products at a pressure other than atmospheric pressure it is usually so that a change from one product to another product can only be made with a lot of trouble since many of the components are accessible only with restrictions, and need to be cleaned or replaced. Furthermore, satisfying hygiene code requirements is only possible at great expense.

The object of the present invention is to improve a method and an apparatus for drying or heat-treating products in a treatment chamber operating at a pressure other than atmospheric pressure. More particularly, the intention is to provide a method or apparatus with which drying or heat-treating of products is possible by ways and means which are hygienic, preferably without detrimenting taste and quality of the product to be treated as well as being cost-effective and low-wearing. Where food processing is concerned, it is furthermore the intention to make an end product possible having improved properties. Preferably, the method and the apparatus are intended to be suitable for drying banana chunks into banana chips, as starting product for a banana powder to be produced. Further banana chips and the banana powder to be produced therefrom are to be produced with as instant-type banana chips and powder. Furthermore, it is the intention to provide a transport receptacle suitable for implementing the method.

In accordance with the present invention there is provided a method of drying or heat-treating products in a treatment chamber, in which a pressure other than atmospheric pressure prevails, in which the products to be treated are charged in a transport receptacle. The transport receptacle is transported into the treatment chamber via a charging lock chamber in which the pressure is made equal to that existing in the treatment chamber. In the treatment chamber the product to be treated is guided past a heating source, preferably a microwave and/or infrared source by means of a main conveyor means arranged in the treatment chamber. This is followed by the discharge via a discharging lock chamber in which the pressure is made equal to another pressure, preferably to ambient air pressure. Preferably, to each charging and discharging lock chamber conveyor means are associated, which are independent of the main conveyor means in the treatment chamber.

In accordance with the invention the product to be treated does not come into contact directly with any of the conveyor means or any other components, thus effectively preventing soilage or contamination of the components difficult to access, for example conveyor belts in the treatment chamber. One advantage is that a change from one kind of product to another may be simply done without any detriment to the other product in each case, especially as regards taste, in the case of food products. Another advantage is that in accordance with the invention alternating operation is possible in products differing in provenance and quality may be processed quasi-continuously and without the one detrimenting the other.

Yet a further advantage is that the product to be treated or remainders thereof need not be removed mechanically from a conveyor belt in a vacuum chamber. This adds to the life of a conveyor belt arranged in the treatment chamber due to its reduced wear. Furthermore, the conveyor means are hardly exposed to transverse forces, due to the gentle continual transport, thus reducing the maintenance expense of the apparatus to advantage.

Still another salient advantage is that due to the use of transport receptacles for receiving the products to be treated freedom of design of the conveyor means arranged in the treatment chamber is permitted. In particular it does not need to be configured troughed or expansive any longer.

Preferably the transport receptacles after having passed through the treatment chamber are cleaned before being returned to a repeated processing cycle, thus ensuring hygienic operating conditions by simple ways and means. It is furthermore of advantage that the hygienic condition of the transport receptacles may be simply inspected and that bacteria, germs or spores are unable to multiply unchecked in the treatment chamber, for example in liquid films or product spillage in the treatment chamber. This is especially of advantage when processing or producing medicinal drugs subject to stringent hygiene code requirements. More particularly, in the case of highly-sensitive food products, such as for example banana chunks, berries or mushrooms, using preservatives may now be substantially reduced or even avoided altogether by simple ways and means.

Where allowed by the nature of the product concerned, more particularly in the case of slightly sticky or nonflowable products or substances, the transport receptacle is configured as a plate which need not be rimmed. Should, however, the nature of the product require such a rim, especially where liquid or grainy substances are involved, the transport receptacle is to be configured as a dish having a rim so that the product to be treated is unable to fall or flow off on the side, for example into the treatment chamber, to thus save cleaning and operating costs. Preferably the rim is configured on all sides so that no side spillage whatsoever exists which would otherwise result in loss of the product. The rim may be configured upright, vertical to the bottom of the receptacle or in another suitable way to effectively prevent loss of the product during treatment.

Even better hygienic conditions are possible when the product is placed on a net or grid or on a replaceable net frame arranged in the transport receptacle. By configuring the portion coming into contact with the product as an airy, lightweight net, cleaning it may be affected even simpler and more effectively. Furthermore, moisture emitted by the product during drying is able to escape practically unrestricted on all sides, which accelerates drying and thus helps in saving costs. Preferably a gap is provided between the net or the receiving surface and the transport receptacle to enable the emitted moisture to be removed even more expediently.

It is particularly in the case of processing medicinal drugs that sterile disposable transport receptacles or replaceable disposable nets may also be put to use, thus making the range of application of the apparatus or method even wider.

In one preferred embodiment to make more efficient use of the handling volume several such nets are stacked vertically in one and the same transport receptacle. For this purpose replaceable nets or net frames are provided. These nets or net frames may be identical in basic surface area. For stacking, the nets are preferably impaled on guide posts in the transport receptacle, cylindrical sleeves of suitable height serving as spacers between the individual nets. However, the nets or net frames may also differ in basic surface area, located on a stepped transport receptacle rim at various levels.

Where the consistency of the product permits, the bottom of a transport receptacle may be perforated so that the problem of any product remaining in the interior of the transport receptacle as well as contamination of the product is even further reduced. Such a transport receptacle also permits a convection drying in a downstream treatment zone without the product needing to be transfer-filled.

To prevent the product from being lost upwards on drying, for example by jumping out of place on being puffed, (i. e. a process by which the inner structure of the product is changed as commonly known in popcorn) the transport receptacle may be closed off at the top by a net, grid or the like. For holding such a net in place, for example, it may be impaled on guide posts arranged on the transport receptacle or clamped in place at the rim of the transport receptacle with the aid of a suitable mechanism.

The charging and discharging lock chambers are configured as pressure-tight lock chambers. It is of advantage that in this way the leakage rate of the apparatus is effectively reduced. The chambers are connected to one or more vacuum pumps or compressors via conduits each section of which may be shut off separately. When drying most of the food products, air is sucked out of the treatment chamber so that it is worked at a reduced atmospheric pressure, preferably at about 20–100 mbar. There are different food products, e. g. tea, which are dried at a pressure which is higher than atmospheric pressure. The water taken out of the food product is generally eliminated by condensation.

Preferably the volume of each charging and discharging lock chamber is very much smaller than that of the treatment chamber so that only a very minor volume of gas needs to be pumped when the transport receptacle is loaded in the charging lock chamber or unloaded from the discharging lock chamber. Thus the heat-treatment in the treatment chamber may be performed continuously or quasi-continuously. To maintain constant operating conditions the treatment chamber is preferably permanently connected to a vacuum pump or the gas reservoir.

Preferably the charging and discharging lock chambers may be shut off pressure-tight by means of doors connecting the environment or the treatment chamber, for example by means of pressure-tight slide or gate valves. For charging/discharging the product the treatment chamber is equalised in pressure each time via separate pressure equalising conduits with separately shut off means.

For conveying the transport receptacles, each of the charging and discharging lock chambers is associated to a conveyor means, conveyance being done so that the transport receptacles are transported practically with no jolting and without any excessive acceleration so as not to cause them to topple, such means making it sure to advantage that no product spillage occurs in the treatment chamber. Preferably conveyance is oriented horizontally.

Preferably the conveyor means is a conveyor belt arranged in the transport direction upstream or downstream of a conveyor belt located in the treatment chamber. To permit a more efficient transfer of the transport receptacle into and out of the treatment chamber the conveyor belt in the treatment chamber preferably features a surface roughness other than that of the conveyor belts of the charging and discharging lock chambers. Preferably the surface roughness of the belt in the treatment chamber is rougher.

In another embodiment the transport receptacle is shifted by means of a first pusher onto the floor plate of the charging lock chamber and further shifted into the treatment chamber by means of a further longitudinally movable pusher arranged in the charging lock chamber, the discharge from the apparatus being done analogously. To advantage the height of the charging and discharging lock chambers in this embodiment is very small, enabling it to be adapted to the maximum height of a transport receptacle, which helps in saving the costs of operating the system. However, any other means such as, for example, side chains, side belts, push rods and the like, for example, are possible as the conveyor means.

Arranged in the treatment chamber is at least one heating source, preferably vertically above the conveyor means and extending more or less over the full width of a transport receptacle. Preferably the product is heated or dried in the treatment chamber by means of microwave radiation. The microwave radiation is coupled into the treatment chamber and evenly distributed over an expansive zone by means of a correspondingly configured end portion of a microwave waveguide so that the treatment of the product is as uniform as possible. At the input and output end the microwave radiation is shielded practically completely from extraneous radiation by metal shields having an opening for passage of the conveyor means.

Preferably the treatment chamber is subdivided into several treatment zones by means of shielding means, such as for example metal plates having an opening for passage of the conveyor means, these treatment zones being substantially decoupled as regards the microwave radiation. Preferably simultaneous treatment of several transport receptacles or implementing several steps in the treatment are possible in the chamber to thus permit a high throughput of the system.

Preferably not a microwave source but some other heating source, such as, for example, an infrared heating source is arranged in the last segment and optionally also in the first segment of the treatment chamber so that the various steps in the method may be implemented directly in sequence in the treatment chamber under the same pressure conditions. It is furthermore of advantage that due to using microwave shielding means the doors connecting the charging or discharging lock chamber may be opened without the microwave source needing to be switched off, as long as the outermost doors of the charging or discharging lock chamber are microwave tight, this enhancing the life of the microwave source due to operation being more uniform.

In one preferred embodiment a comparatively short, intensive microwave treatment is followed by a longish resting period or dwell time, where necessary including further drying of the product under other conditions. For this purpose a further separate conveyor means is provided in the treatment chamber. To minimize the space requirement of the apparatus in accordance with the invention the transport receptacles thereof are preferably charged in a lifting conveyor system having vertical up and down guidance, for example, in a paternoster-type conveying system, the circulating speed of the lifting conveyor system being dimensioned so that the desired dwell time is maintained. Preferably, further drying is done in the treatment chamber by means of infrared heating sources arranged on the inner wall of the dwell chamber.

In another embodiment the dwell chamber is separated from the treatment chamber by a pressure-tight door so that a pressure differing to that otherwise may be built-up in the dwell chamber. So that only minor gas volumes need to be pumped in transfer of the transport receptacle, a further, charging lock chamber of small volume, as described above, is preferably provided upstream of the connecting door.

To reduce the material requirements on the conveyor means of the treatment chamber as regards microwave resistance, another preferred embodiment makes use of—instead of an expansive conveyor belt—a conveyor means coming into contact and conveying the transport receptacle at its rim, preferably outside of the microwave zone or in zones of reduced microwave intensity. For this purpose the rim of the transport receptacle may be configured, for example, widened and rest on two narrow conveyor belts, bands or chains running along the edge of the treatment chamber which are driven at the same speed. In another embodiment the rim of the transport receptacle rests on a row of eccentrics driven in synchronism but differing in phase so that the transport receptacle is transported by a slight up and down movement in the forwards direction. It will be appreciated that other suitable means of conveyance are possible for conveying the transport receptacle.

In implementing the method in accordance with the invention the product to be treated, before entering the treatment chamber, is preferably subjected initially to a suitable predrying, for example, convective drying to a residual moisture content of down to 40% before then being subjected to the treatment as described above in the treatment chamber in which the product is exposed preferably to an intensive microwave radiation and subsequently to an optional further infrared radiation. Due to the microwave radiation the product is heated up deep-down. Preferably the intensity of the microwave radiation is set so that a voluminous cellular break-up or decomposition occurs in the case of biological materials, as is known for example in puffing popcorn from grains of maize.

After puffing, near-surface drying of the product is preferably done with the aid of infrared radiation. On leaving the treatment chamber the residual moisture content may extend as far down as to 8%, it amounting preferably to between 20% and 25%. Depending on the requirements on the finished product the residual moisture content may then be further reduced down to 2 to 6% in subsequent after-drying, for example by convective drying.

It has been discovered in extensive tests on various food products that food products treated by the method in accordance with the invention exhibit a series of highly advantageous properties. More particularly, the food products thus treated exhibit a very fast rehydration in being pre-cooked, due to the dry product remaining airy and porous due to being puffed and thus facilitate the ingress of water. The outer appearance of the treated food products is also of great advantage since the considerable shrinkage in volume caused by the drying may be compensated at least in part by the puffing. Furthermore, there is practically no change in taste because of the more gentle treatment. The method in accordance with the invention has proven to be particularly of advantage in drying banana chunks into banana chips and in their further processing into instant-type banana powder.

Preferably the method in accordance with the invention is used for drying highly-sensitive food products, such as for example banana chunks, berries or mushrooms, a further preferred use relating to drying liquid or solid or lumpy medicinal drugs.

Preferred example embodiments of the present invention will now be described by way of examples and with reference to the attached drawings in which:

DETAILED DESCRIPTION OF THE DRAWINGS

Figure 1:
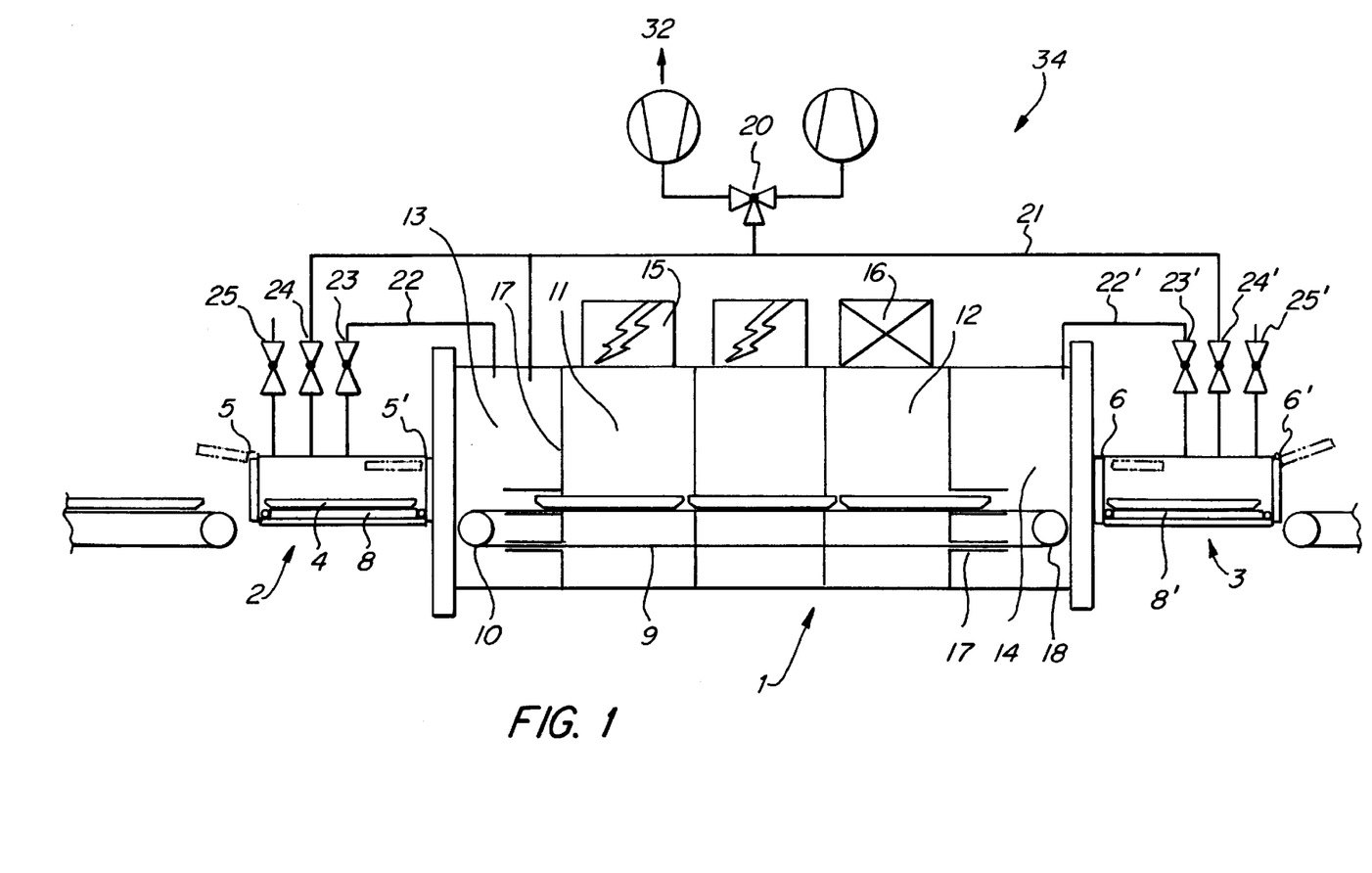
FIG. 1 is a section through a first embodiment of an apparatus in accordance with the invention.

Referring now to FIG. 1 there is illustrated the apparatus comprising a central treatment chamber 1, an upstream charging lock chamber 2 as well as a downstream discharging lock chamber 3. Each of the charging and discharging lock chambers 2 and 3 respectively may be closed off pressure-tight relative to the environment via separate inlet gates 5 and 6 and outlet gates 5' and 6' respectively, sealing elements being provided in each case for this purpose. The outlet gate 5' and the inlet gate 6 also close off the treatment chamber 1 pressure-tight, whereby the treatment chamber 1 may also feature further doors, for example for implementing installation and maintenance tasks.

Figure 3:
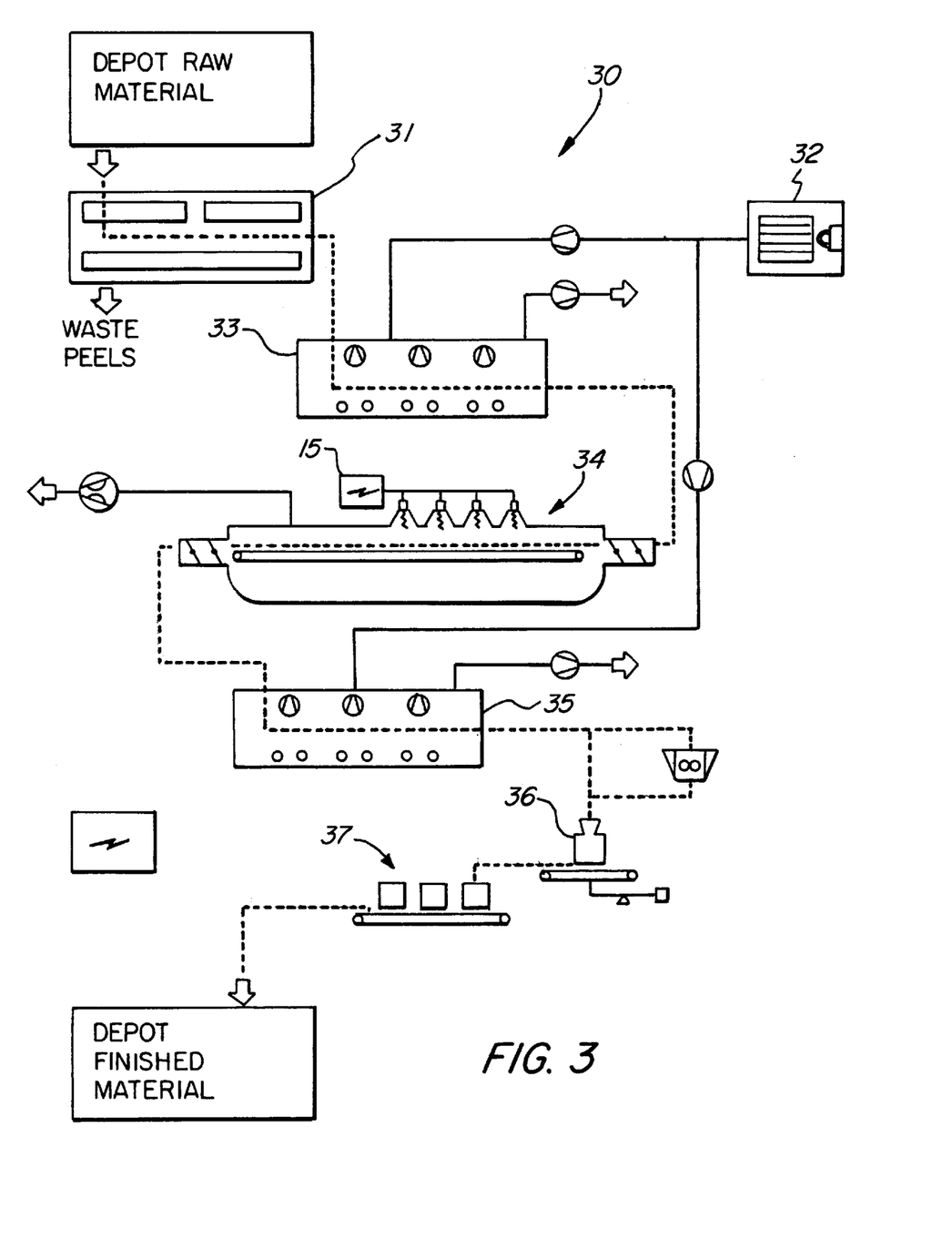
FIG. 3 is a flow diagram relating to use of a method and apparatus in accordance with the invention including upstream and downstream treatment zones.

Via a three-way valve 20 as well as further shut-off valves 24 or 24' the chambers are connected to a vacuum pump (32;

FIG. 3), a compressor or a gas reservoir with an inert gas at a suitable pressure. The charging and discharging lock chambers may be vented via discharge valves 25 and 25' respectively. For venting the internal chamber 1 a further discharge valve may be provided. Via corresponding equalisation conduits 22 and 22' respectively as well as the associated shut-off valves 22 and 23' respectively the charging and discharging lock chamber respectively is connected to the central treatment chamber 1 for pressure equalisation.

To each lock chamber 2 and 3 conveyor means 8 and 8' respectively are associated respectively, configured in this example embodiment as a belt conveyor means arranged in the corresponding lock chamber. Arranged upstream and downstream of the lock chambers 2 and 3 respectively are further treatment zones and conveyor means as described further on in conjunction with FIG. 3. In the treatment chamber 1 a further conveyor means 9 is arranged which in the example embodiment as shown is likewise configured as a belt conveyor with end guide pulleys 10 arranged in the vicinity of the connecting doors. The conveyor means 9 may be divided into two independent conveyor means as described further on with reference to FIG. 2.

As illustrated in FIG. 1 each conveyor means is arranged in series in the transport direction, the spacings between the individual conveyor means 8 and 9 and 9 and 8' respectively being dimensioned no larger than the length of a transport receptacle 4. The spacing between the individual conveyor means is substantially dictated by the wall thickness of the chambers and the respective connecting gates.

For heat treatment at least one heating source is arranged in the treatment chamber 1, preferably above the transport belt 9. The apparatus as shown in FIG. 1 comprises for this purpose two microwave sources 15 as well as optionally a further heating source 16 (indicated by broken lines), for example, an infrared radiator. The microwave generators may be arranged within the treatment chamber 1. In one preferred embodiment the microwave generators are located outside of the treatment chamber, however, at atmospheric pressure, the microwave radiation being coupled into the treatment chamber 1 via suitably shaped waveguides. In this arrangement the microwave radiation is radiated into the treatment chamber 1 through a pressure-tight dielectric coupling window. The end portion of the waveguide is preferably configured so that the microwave radiation within the treatment zone is uniform, the width of this zone corresponding roughly to the width of transport receptacle 4. The intensity of the microwave radiation and the pressure conditions are suitably selected so that no glow discharges can take place in the treatment chamber.

With the aid of shielding means 17 provided preferably shiftable the treatment chamber 1 as shown in FIG. 1 is divided into several segments or treatment zones 13, 11, 12 and 14. The shields 17 are metal plates having slots for the conveyor means 9 and the transport receptacle 4. The inlet and outlet end shields are bent parallel to the conveying direction in the region of the passage openings near to the conveyor means 9 so that the inlet and outlet zones 13 and 14 respectively are substantially free of microwave radiation.

For screening off the microwave radiation, the treatment chamber as well as the lock chambers 2 and 3 are fabricated of sheet metal, the material of the transport receptacles as well as that of the conveyor means 9, including the pulleys 10 and the belt being likewise designed for minimum absorption of microwave radiation. For this purpose preference is given to non-polar materials such as for example polytetrafluoroethylene (PTFE) or polythene (PET). Preferably the inner wall surface of a transport receptacle is micro-roughened to obviate product remainders from adhering thereto.

For drying, the product to be treated is conditioned in upstream zones (see FIG. 3) and loaded in a transport receptacle 4 evenly and in a suitable layer thickness, of 60 mm, for example. Before the inlet gate 5 of the charging lock chamber 2 is opened a shut-off valve 25 ensures the pressure being made equal to that of the environment. The inlet gate 5 is then opened by it being hinged upwards for example (as indicated by the broken lines) and the transport receptacle 4 is transferred to the conveyor means 8 of the charging lock chamber 2. After this the inlet gate 5 is closed and the pressure between the charging lock chamber 2 and the treatment chamber 1 is equalised by opening the shut-off valve 23 via the pressure equalising conduit 22. This is followed by the outlet gate 65' being opened and the transport receptacle 4 transferred on actuation of the conveyor belt 8 to the conveyor belt 9 of the treatment chamber 1. After this, the outlet gate 5' of the charging lock chamber 2 is reclosed and a new charging cycle can commence.

In this embodiment a control unit (not shown) ensures that it can never happen that both end gates of the lock chambers and treatment chamber respectively are opened at the same time, except for maintenance work. Preferably, the position of the transport receptacle in each case is detected via optoelectronic sensors and the opening action of the gates and drive of the conveyor means controlled correspondingly. To minimise the length of the lock chambers 2 and 3 the conveyor means in each case are operated preferably clocked.

In another embodiment a separate vacuum pump is provided for the treatment chamber 1 to ensure stable pressure conditions therein, For evacuating the lock chambers a second vacuum pump is provided. The control of the shut-off valves and the conveyor means is analogous to that as already described.

From the charging zone 13 the transport receptacle 4 is transported in the direction of the heat treatment zones, the conveyor belt 9 preferably running continuously for this purpose. Directly following microwave treatment in the at least one microwave zone 11 a further heat treatment, for example by means of an infrared radiator 16 may optionally be provided or the transport receptacle 4 is transported further without any further heat treatment to allow the product to rest and cool. For this purpose the discharge zone 14 may be provided. The discharge via the discharging lock chamber 3 follows similar to that as already described for charging into the charging lock chamber 2.

Once the transport receptacle 4 has passed through the main treatment zone 34 as well as any subsequent treatment zones (see FIG. 3) the transport receptacle is cleaned before being re-used or at least when a change is made in the product to be treated. Depending on the hygiene code requirements cleaning is done either purely mechanically or the transport receptacle 4 is washed and where necessary disinfected or sterilised and dried prior to being recharged. To facilitate the cleaning step in one preferred embodiment the product to be treated is not placed directly on the bottom of the transport receptacle 4, it instead being placed on a net located thereabove having a suitable mesh for the solid or lumpy product. For drying medicinal drugs the transport receptacle 4 and/or the net may be designed to be disposable.

Various ways and means are available to design the transport through the main treatment zone 34 even more efficiently. To facilitate the transfer of the transport receptacle 4 the surface roughness of the conveyor belt in the treatment chamber 1 may be rougher than that in the lock chamber 2 or 3. Preferably the circulating speed of the conveyor belts in all lock chambers may be higher to support transfer of the transport receptacles. Furthermore, studs may be arranged on the conveyor belts on a suitable center-spacing, endowing the rim of the transport receptacle 4 with a forwards drive on being transferred to a downstream belt, by the studs being deflected from their normal vertical position due to the deflection of the conveyor belt at the corresponding guide pulleys.

Instead of a single expansive conveyor belt 9 in the treatment chamber two narrow conveyor belts driven in synchronism, the same in length, may be provided at the wall of the treatment chamber 1. Preferably these conveyor belts run in a zone of low microwave intensity so that less costly materials may be used for this purpose. As an alternative several eccentrics may be provided in series on the two sidewalls of the treatment chamber which in being driven in synchronism but out of phase continue transport of the transport receptacle 4 with a slight up and down movement. As an alternative side guide rails may also be provided on which the transport receptacles 4 are transported further by incremental drives (not shown). For contact in the such rim areas the upper rim of the transport receptacle 4 may be devised widened.

In one preferred embodiment, especially for drying banana chunks, the dwell time in the zone 12 or 14 in the absence of a heat-treating is longer by a certain factor than the duration of the microwave treatment in the zones 11. In continuous or quasi-continuous operation of the system the length of the zone 12 needs to be longer by the same factor than the length of the zone 11 which increases the overall length and thus the costs of the apparatus to disadvantage. If the factor is not too large, for example factor 2 to 3, a separate conveyor means may be provided in the downstream zone 12 which is wider than the the conveyor means 9 in the microwave treatment zone 11 by at least this factor. For this purpose means need to be provided for side shifting the transport receptacles 4, for example with the aid of an arm which side-shifts the transport receptacles alternatingly or cyclically and positions them on the separate conveyor means.

Figure 2:
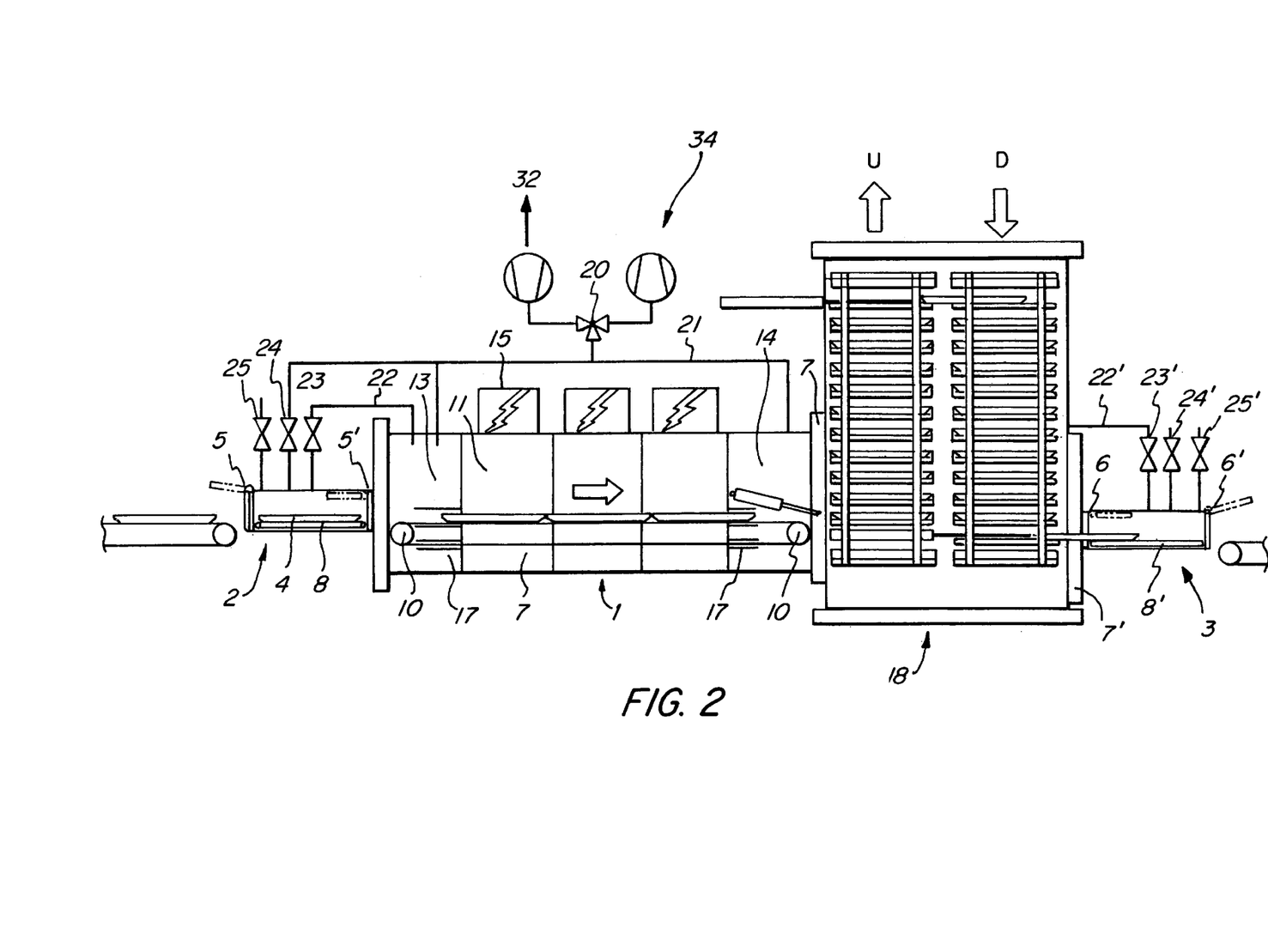
FIG. 2 is a section through a further embodiment of an apparatus in accordance with the invention including a dwell chamber and lifting conveyor system.

Should, however, this factor be even larger, exceeding, for example, the factor 10, then—in a further preferred embodiment—the further conveyor means is designed as a lifting conveyor system for vertically stacking and for transporting the transport receptacles 4 in upwards and downward direction. Referring now to FIG. 2 this embodiment will now be described in which like components are identified by like reference numerals, as already explained with reference to FIG. 1.

In this embodiment the treatment chamber 1 is followed by a dwell chamber 18 which may be closed off from adjoining chambers by additional inlet and outlet gates 7 and 7' respectively. Controlling the conveyor means necessary in this respect is done analogous to the charging the charging lock chamber 2 as already described. The dwell chamber 18 is likewise connected to the vacuum pump via the connecting conduit 21 and is expediently connected to the adjoining chambers 1 and 3 respectively by corresponding equalisation conduits including shut-off valves for pressure equalisation.

The vertical conveying system in the dwell chamber 18 comprises a number of frames or surface areas for supporting a transport receptacle 4 which circulate preferably like a paternoster, the transport receptacles 4 first being transported in the upwards direction U and subsequently in the downwards direction D. Lifting conveyance occurs either circulatory on the paternoster principle or the transport receptacles 4 are shifted onto a second lifting conveyor system D as shown in FIG. 2. Once the transport receptacle 4 has in turn attained the level of the conveyor means 8' in the discharging lock chamber 3 it is transferred analogously into the discharging lock chamber 3. Preferably, the lower reversal zone of the lifting conveyor system is roughly at the level of the adjoining conveyor means.

The circulating speed or the dwell time in the dwell chamber 18 may be varied and thus adapted to the factor or the ratio of the microwave treatment duration to the desired dwell time. The circulating times of the vertically conveying system and of the conveyor means 9 of the treatment chamber 1 are matched with each other preferably in an integer ratio.

In the dwell chamber 18 the heat-treated product rests for a predetermined time. As an alternative, however, further after-drying of the product may be done in the transport receptacles 4, for example by means of infrared radiators mounted either to the sidewalls of the dwell chamber 18 or, however, above a transport receptacle 4 on the transport frame located thereabove for supporting the transport receptacle 4. Optionally also pressure different from that in the treatment chamber 1 may be set in the dwell chamber 18. For this purpose an additional lock chamber analogous to the charging lock chamber 2 is arranged in the zone 14 of the treatment chamber 1, the interior volume of this lock chamber exceeding the overall volume of a transport receptacle preferably only unsubstantially.

It will be appreciated that the dwell chamber 18 in a continuous or quasi-continuous process may also serve to compensate fluctuations in the conveying speed for instance in the case of the system malfunctioning, since should the conveyor means 9 or 8' be at a standstill the transport receptacles 4 are able to simply continue circulating without any further heat-treating taking place. This principle may also be transferred to the charging and discharging lock chambers 2 and 3 respectively by the charging and discharging lock chambers 2 and 3 respectively being provided with a similar lifting conveyor system. These stacking units may be equipped with an additional number of transport receptacles 4 on a standby arrangement which in the case of a system malfunction, for example on belt standstill in an upstream unit, may be continued to be supplied to the downstream unit in each case. As an alternative a stacking unit for feeding the treatment chamber 1 may also be equipped in one go with a number of transport receptacles 4 and the stacking unit may be introduced as a whole into the charging lock chamber 2 subsequently, for example with the aid of a fork-lift truck. In this way the charging lock chamber 2 needs to be vented once only for equipping with several transport receptacles 4.

Referring now to FIG. 3 there is illustrated a schematic flow diagram to explain the sequence in the steps of the method in accordance with the invention. Following storage or supply of the raw material the product is suitably conditioned in a preprocessing unit 31 for drying. In the case of fruit, for instance, this is first cleaned, peeled and cut into chunks of suitable size prior to drying. The product to be treated is then loaded in transport receptacles of a suitable size. Before the transport receptacles are charged into the main treatment chamber 34 as described with reference to FIGS. 1 and 2, a predrying sequence may be implemented.

For this purpose a pre-treatment chamber 33 is provided in which predrying is done optionally with the aid of infrared radiation or microwave radiation at a pressure which is normal, reduced or elevated. The pre-treatment chamber 33 like the main treatment chamber 34 and the after-treatment chamber 35 is connected to a vacuum pump 32 or a compressor or the like via shut-off valves and connecting conduits. The charging and discharging lock chambers may be arranged in the pre- and after-treatment chamber respectively.

The drying in the main treatment chamber 34 may be followed, similar to pre-drying, by after-drying. Pre- and after-drying may be performed convectively, for the purpose of which fans (see FIG. 3) are arranged in the pre and after-treatment chambers. The conveyor means in the pre- and after-treatment chambers may be conventional belt conveyors. This is then followed by further processing of the treated or dried product into the desired finished product, involving for example further size reduction or milling in a unit 36, blending with other products and final packaging in the finishing unit 37.

Preferably the method is used for the production of banana chips or banana powder made therefrom by milling, the bananas being chopped into chunks and the chunks of bananas first being pre-dried to a suitable residual moisture content before the banana chunks are dried for roughly one minute by means of microwave radiation and puffed and subsequently left to rest for roughly 9 minutes in the treatment chamber 1. Subsequent after- drying is implemented to attain a suitable residual moisture content down to 2 to 6%. The pressure existing in the treatment chamber is preferably between approx. 20 mbar and 100 mbar. Due to the use of transport receptacles the system may be operated continuously and without maintenance and cleaning downtime. The banana chips or banana powder also remain good without the addition of preservatives. Due to its excellent rehydration properties banana powder is suitable for preparing a naturally tasting banana pulp.

Further preferred forms of use relate to drying berries, potato chips or mushrooms which have turned out to be highly problematic in drying by means of conventional systems especially since, due to coming into contact with parts of the apparatus, such as for example conveyor belts or gates, soilage of the dried fruits and contamination by bacteria etc. occurs. Due to the gentle treatment conditions in accordance with the invention such and also other starting or basic products may be dried with no problem.

By varying the conditions in microwave treatment, subsequent resting/dwelling in the main treatment chamber 34 and during pre- and after-drying a wealth of greatly differing substances or products may be suitably dried. In particular, in drying food products the conditions in the microwave treatment may be selected so that a suitable cellular break-up and puffing up of the product occurs which promotes a fast rehydration, for example during pre-cooking. For the majority of food products resting times specific to the product concerned are involved subsequent to microwave treatment which may be suitably set, for example by means of programmed control routines.

Yet a further preferred use of the method relates to drying medicinal drugs subject to particularly stringent hygiene code requirements. These can be easily complied with, because the products to be treated do not come into contact with a conveyor belt or similar conveyor means which are difficult to clean, the products instead coming exclusively in contact with transport receptacles which are relatively easy to clean and sterilise.

It is to be noted that the method in accordance with the invention is suitable not only for drying solid, lumpy or grainy substances or products, but also for drying liquid or pasty substances. For example, the method may be put to use in the production of orange juice powder, whereby an intensive pre-drying and thickening of the orange juice or orange juice concentrate takes place in the pre-treatment chamber 33 followed by microwave treatment with final after-drying into a solid product.

Figure 4:
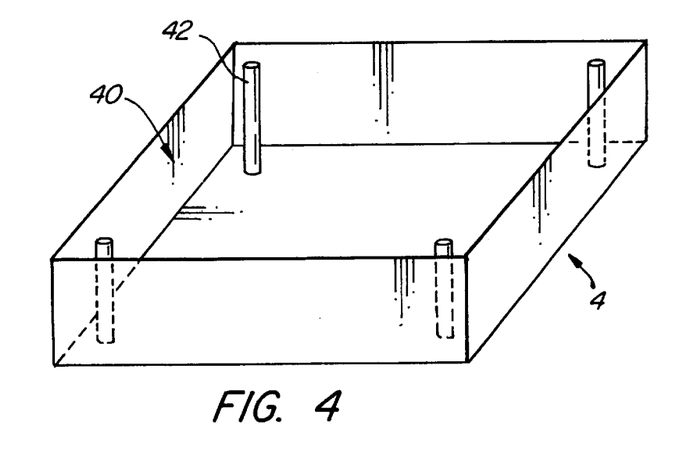
FIG. 4 illustrates a dished transport receptacle showing a few examples of rim sections (a) to (c).

Referring now to FIG. 4 there is illustrated in the lower half thereof a transport receptacle 4 configured as a dish with a rim 40 on all sides and having several guide posts 42. The upright guide posts 42 are located in the vicinity of the corner points so that the guide posts 21 are arranged on a basic square. The guide posts 42 are used to mount a plate having suitable guide holes or a net or a sieve. Where several nets or plates are stacked one on the other the cylindrical guide sleeves (not shown) serve as spacers, the level of which is adapted to the thickness as usual in heat-treating and amounting to 70 to 80 mm, for example. The height of the rim 40 and of the guide posts 42 is dimensioned so that also in a stacked arrangement of several nets or plates the guide posts protrude from the topmost plate or net to permit a final net to be mounted to prevent escape of the product into the treatment chamber, for example, during puffing.

Figure 4A:
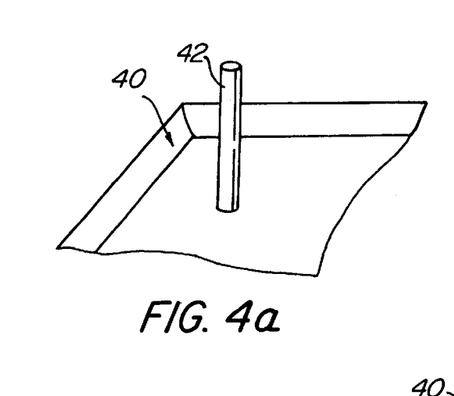
Figure 4B:
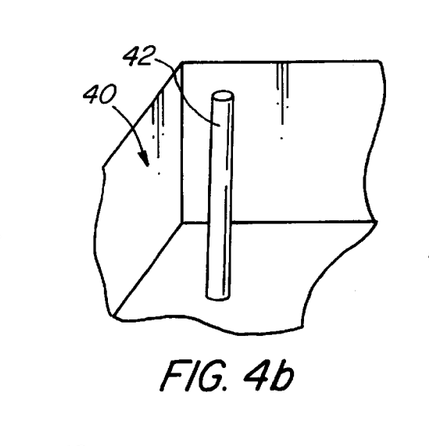
Figure 4C:
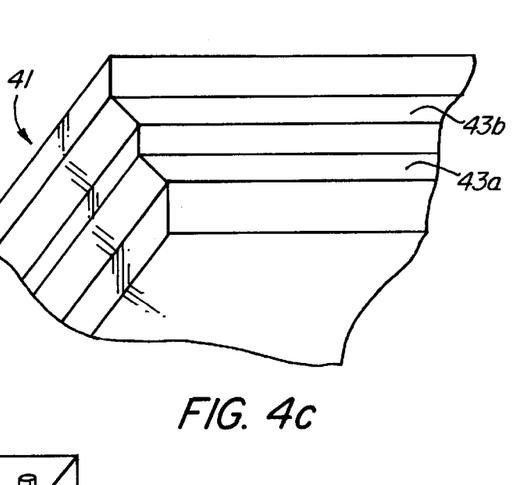

Referring now to FIG. 4a there is illustrated how the rim 40 of the transport receptacle 4 may also be configured relatively shallow or even eliminated altogether if the product to be dried adheres to the plate or net by itself. As evident from FIG. 4c the guide post 42 may also be totally eliminated when the rim 41 of the receptacle is configured stepped, for example, including several mounting surface areas 43a, 43b for plates or nets differing in basic surface area. In the case of the embodiment as shown in FIG. 4b too, the guide post 42 may be eliminated when the nets or plates to be stacked in the transport receptacle 4 are provided with spacers suitable in height. Preferably there is provided between the rim 40, 41 of the transport receptacle and the edge of the plate or net a sufficient gap so that moisture escaping from the product during ng may be effectively exhausted.

In the following, the reference numerals as used in the drawings are explained.

List of Numerals
1. main treatment chamber
2. charging lock chamber
3. discharging lock chamber
4. transport receptacle
5,5' inlet/outlet gate of charging lock chamber
6,6' inlet/outlet gate of discharging lock chamber
7. inlet/outlet gate of dwell chamber
8,8' conveyor means of charging/discharging lock chamber
9 conveyor means of main treatment chamber
10 guide pulleys for conveyor means of main treatment chamber
11 microwave treatment zone
12 additional treatment zone (e.g. infrared, optionally)
13 charging zone of main treatment chamber
14 discharge zone of main treatment chamber
15 microwave source
16 infrared source (optional)
15 microwave shield
18 dwell chamber with vertical conveyor means
19
20 three-way valve
21 vacuum/pressure conduit
22,22' pressure equalising conduit 23,23' shut-off valve for pressure equalising conduit
24,24' shut-off valve for vacuum/pressure conduit
25,25' outlet valve
30 processing system
31 pre-processing (washing, peeling, chopping, . . . )
32 vacuum pump/compressor
33 pre-treatment (pre-drying–> approx. 40% residual moisture content)
34 main treatment (puffing–> 8–30% residual moisture content, preferably 20–25%)
35 after-treatment (after-drying–> 2–6% residual moisture content)
36 milling/chopping finished product
37 finishing/packaging
40 rim of transport receptacle
41 stepped rim of transport receptacle
42 guide post of transport receptacle
43a/b contact surface areas on stepped rim 41

What is claimed is:

1. A method for heat-treating and drying food products comprising the steps of:
    loading the products to be treated into a not tightly closed transport receptacle;
    charging said transport receptacle into a charging lock chamber,
    bringing a pressure of the charging lock chamber to a pressure of a treatment chamber;
    continuously transferring said transport receptacle from said charging lock chamber across said treatment chamber into a discharging lock chamber by means of a main conveyor means,
    while maintaining the pressure of the treatment chamber at vacuum, and
    heat-treating said product with microwave radiation in said treatment chamber,
    adjusting a pressure in the discharging lock chamber to atmospheric pressure, and
    discharging said not tightly closed transport receptacle from said discharging lock chamber and bringing it to said atmosphere.

2. The method as set forth in claim 1, wherein a plurality of transport receptacles is conveyed, one after the other in a continuous line across said main treatment chamber.

3. The method as set forth in claim 1, wherein in transferring said transport receptacle into said treatment chamber and/or into said discharging lock chamber a pressure equalization is undertaken.

4. The method as set forth in claim 1, wherein in transferring said transport receptacle into said treatment chamber and/or into said discharging lock chamber one connecting door each of said treatment chamber is opened and reclosed.

5. The method as set forth in claim 1, wherein said product to be treated is arranged in several layers in said transport receptacle.

6. The method as set forth in claim 1, wherein heat-treating of said product is done in two steps, said product being broken up or puffed up by means of microwave radiation in said first step and broken-up product being dried by means of infrared and/or microwave radiation for obtaining a well rehydratable product having an instant character in said second step.

7. The method as set forth in claim 1, wherein said heat-treating is performed in said treatment chamber at a reduced atmospheric pressure, preferably in the range 20–100 mbar.

8. The method as set forth in claim 1, wherein pre-drying of said product, preferably to a residual moisture content of approx. 40%, is performed in a treatment zone upstream of said treatment chamber, and/or after drying said product, preferably to a residual moisture content of approx. 2 to 6%, is performed in a treatment zone downstream of said treatment chamber.

9. A transport receptacle for use in a method as set forth in claim 1, wherein said transport receptacle is configured in the shape of a dish.

10. The transport receptacle as set forth in claim 9, the bottom thereof being provided with holes.

11. The method defined in claim 1, further comprising the steps of:
    dividing the products into a plurality of pieces, wherein said products are selected from the group consisting of dried fruits and dried vegetables,
    heat-treating the pieces in a pre-charging chamber upstream from the charging lock chamber by utilizing at least one micro-wave source so that a cellular break-up and puffing up of said food products occur for obtaining well-hydratable food having an instant character.

12. The method defined in claim 11, wherein the step of dividing the food products is selected from the group consisting of shredding, chopping and milling.

13. The method defined in claim 12, wherein the food products are milled into a food powder.

14. A Method as set forth in claim 1, wherein said food product is heat-treated, in addition to said microwave radiation, with infrared radiation.

15. An apparatus for heat-treating and drying food products, comprising:
    a plurality of not tightly closed transport receptacles for receiving products;
    a charging lock chamber provided with a first conveyor means for transporting the not tightly closed transport receptacle;
    pressure means for gradually lowering a pressure in the charging lock chamber to a first pressure below the atmospheric pressure;
    a treatment chamber provided with a main conveyor for conveying said transport receptacle across the treatment chamber;
    at least one microwave radiation source for heating said products in the treatment chamber;
    means for maintaining the first pressure within the treatment chamber; and
    a discharging lock chamber provided with a second conveyor means for discharging said transport receptacle from said apparatus, the not tightly closed receptacle being continuously conveyed from the charging lock chamber across the treatment chamber and into the discharging lock chamber.

* * * * *